Figure 1:
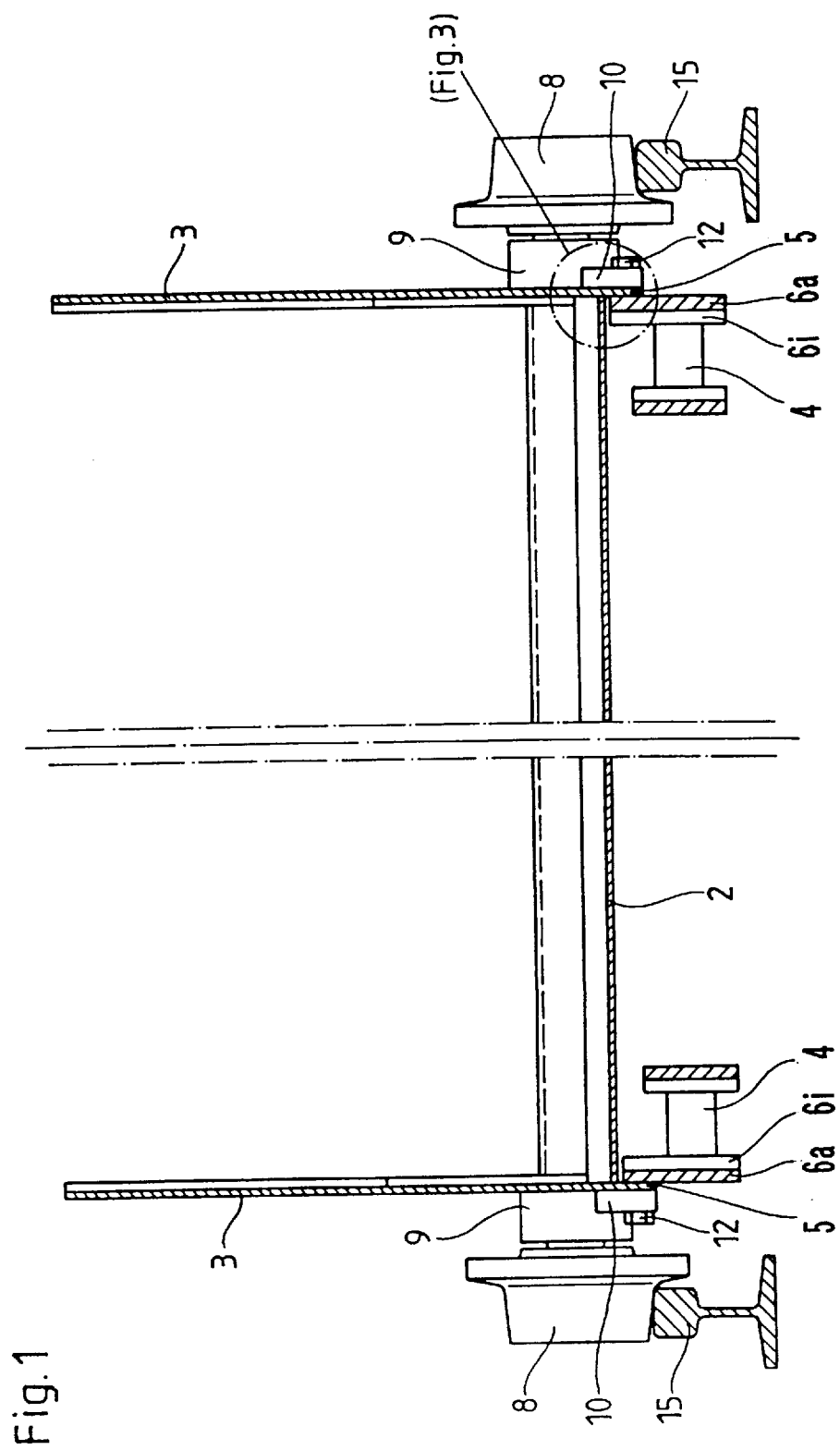

United States Patent [19]
Howe

[11] Patent Number: 5,833,047
[45] Date of Patent: Nov. 10, 1998

[54] APRON CONVEYOR

[75] Inventor: Michael Howe, Harsumer Weg 57, D-46487 Wesel-Bislich, Germany

[73] Assignees: Michael Howe, Wesel-Bislich; Alfons Malek, Geldern, both of Germany

[21] Appl. No.: 737,057
[22] PCT Filed: Apr. 26, 1995
[86] PCT No.: PCT/EP95/01592
  § 371 Date: Jun. 9, 1997
  § 102(e) Date: Jun. 9, 1997
[87] PCT Pub. No.: WO95/29858
  PCT Pub. Date: Nov. 9, 1995

[30]    Foreign Application Priority Data

Apr. 29, 1994 [EP] European Pat. Off. ............. 94106727

[51] Int. Cl.⁶ .................................................... B65G 17/36
[52] U.S. Cl. ........................... 198/708; 198/712; 198/713
[58] Field of Search .................................... 198/707, 708, 198/710, 711, 712, 713

[56]    References Cited

U.S. PATENT DOCUMENTS

| | | | |
|---|---|---|---|
| 565,334 | 4/1896 | Dodge | 198/708 X |
| 4,325,478 | 4/1982 | Richard | 198/711 X |
| 4,503,971 | 3/1985 | Larchmann | 198/711 X |
| 5,143,203 | 9/1992 | Hinner | 198/708 |

*Primary Examiner*—James R. Bidwell
*Attorney, Agent, or Firm*—DeLio & Peterson, LLC

[57]    ABSTRACT

The invention relates to an apron conveyor whose mutually overlapping members, consisting of plates with side walls which connect vertically, are arranged on link chains and are partitioned in a way matching the chain divisions. The slats are provided in their overlap area on their oblique edges on one hand with a limb which points upwards away from the plane of the slat and, on the other hand, with an arched recess which covers the raised limb of the adjacent slat. According to the invention, webs connected to the side walls or formed by them are provided along the length of the side walls. These webs connect the chain links laterally. This arrangement allows the use of standardised link chains of which only one in each link pair must be provided with two holes (in particular threaded holes) for connection of the members to the webs. The chains can be fitted at the outer edge of the slats as far from each other as possible, so that the chains shift towards the immediate vicinity of the rolls which support the slat conveyor and the members are subjected to a minimum of bending strain. It is also possible to arrange the chain wheels in the immediate vicinity of the shaft bearings, so that the bending strain on the chain wheel shaft can also be kept low. In a further embodiment, axial bolt holders mounted on the webs to the side walls and facing the chain links can, together with the chain links, be connected to the webs.

20 Claims, 8 Drawing Sheets

Fig. 3
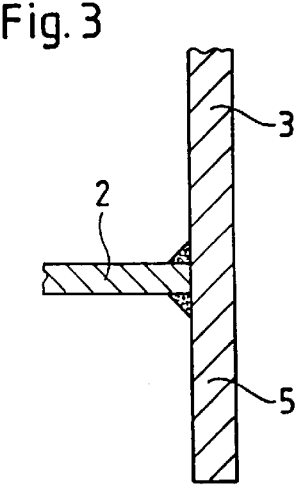
Fig. 4
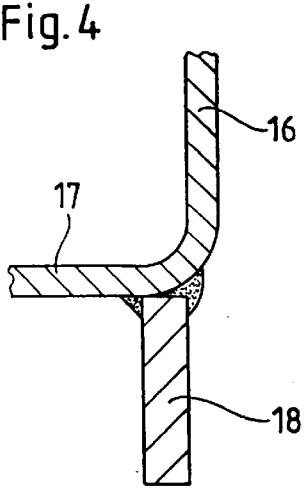
Fig. 5a    Fig. 5b    Fig. 5c
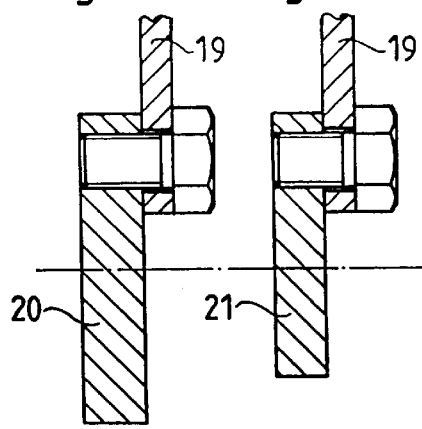 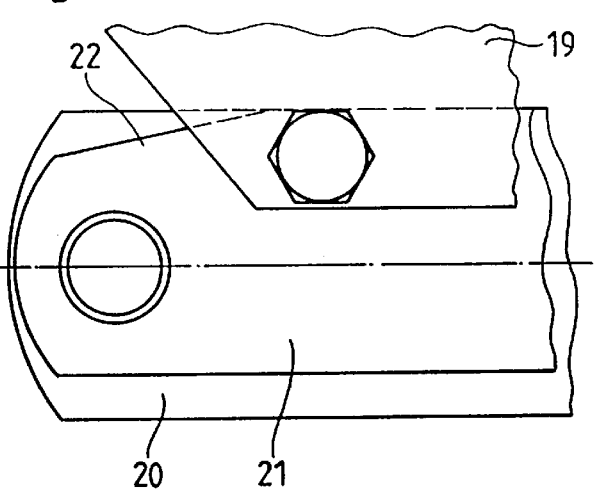
Fig. 6a    Fig. 6b    Fig. 6c
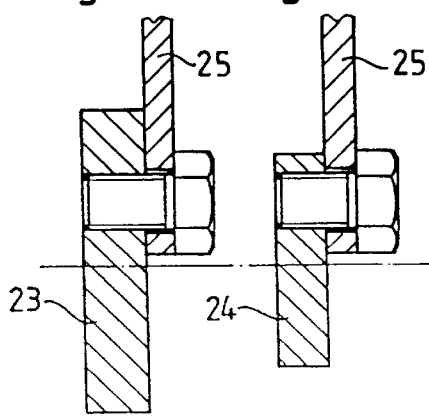 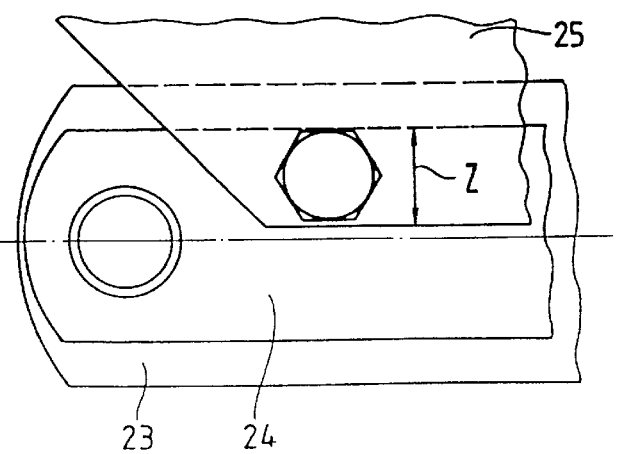

APRON CONVEYOR

The invention relates to an apron conveyor whose elements—which consist of plates with perpendicularly adjoining lateral walls and which overlap one another—are arranged on ladderchains and have a pitch which corresponds to the chain pitch. In order to minimise wear to the plates, contact-free overlapping of the plates is provided. For sealing, in the overlapping region of the plates the transverse edges of the latter are provided on the one hand with a leg directed upwards from the plate plane and on the other hand with a roof-shaped arch which spans the upwards-directed leg of the adjacent plate and from which there issues a leg which is directed downwards towards the plate plane and together with the roof-shaped arch and the upwards-directed leg of the adjacent plate forms a pocket and thereby a type of labyrinth seal of the overlap. The roof-shaped arches can serve as a retaining strip when the apron conveyor is used for steep-gradient conveying. An apron conveyor of this type is for example known from DE-C2-34 38 231.

To connect the plates to the chains, in each case one of the side bars of each side-bar pair is provided with a moulded-on, bent flange whose bent part is provided with holes and is connected to the associated plate by means of screw or rivets. The screw or rivet heads resting on the plates are in contact with the material to be conveyed, are thereby subjected to wear and—depending on the nature of the material to be conveyed—form corrosion centres. The connection of the chain side bars to the plates and the form of the plates with regard to the design of the roof-shaped arch are contradictory and a compromise is required. It is also necessary to keep the connection at a distance from the lateral walls of the plates. This results in a comparatively small distance between the two chain strands, this comparatively small distance having an unfavourable effect with regard to the bending moment acting upon the plates through the weight of the chains—the weight of the chains lies in the order of magnitude close to the weight of the material to be conveyed—and with regard to the bending moment acting on the chain wheel shaft. Moreover, the chains are also arranged at a relatively great distance from the lateral walls so as to have space for axle pin holders which are secured to the underside of the plates and receive the axle pins of the bearing rollers of the apron conveyor.

It is the object of the invention to eliminate the above-mentioned disadvantages of the apron conveyor through a design which copes with stresses better.

This object is accomplished in that with an apron conveyor of the construction described above and outlined in accordance with the preamble of claim 1, at the elements formed from the plates with the perpendicularly adjoining lateral walls, in extension of the lateral walls there are, in accordance with the invention, provided flanges which are connected to the lateral walls or are formed by the lateral walls, the chain side bars being connected to the flanges with lateral contact. Aside from the fact that use can be made of standardised ladder-chains with which only one side bar of each side-bar pair has to be provided with two holes (in particular threaded holes) for connection to the flanges of the elements, the chains can be arranged at the outermost edge of the plates, at the greatest possible distance from one another, whereby the chains move into the immediate vicinity of the rollers supporting the apron conveyor and the elements are subjected to minimal bending stress. The arrangement of the chain wheels in the immediate vicinity of the shaft mounting is likewise possible, so that bending stressing of the chain wheel shaft can also be kept low.

In a further development, in accordance with a further feature of the invention, together with the chain side bars, axle pin holders—lying opposite the chain side bars at the flanges of the lateral walls—can be connected to the flanges, so that separate axles or axle pin holders separately secured to the plates and heavily stressing the plates in a localised manner are not required, it only being necessary to provide the same number of axle bolt holders as the number of bearing rollers which is required according to the stressing of the apron conveyor. The moment brought about by the bearing rollers is not only able to be absorbed in a problem-free manner by the flanges and lateral walls, but compensates for the bending force exerted on the lateral walls by the material to be conveyed and in this way contributes to keeping the overlapping region of the lateral walls tight.

Stressing of the chains differs depending on the application, in particular depending on whether the apron conveyor is used for conveying at a greater or lesser incline, so that for structural simplification and standardisation of the component parts a development is to be recommended with which within a certain load range, chains of different loading capacity, i.e. chains of different cross-sectional dimension of the side bars, are connectable to the elements, advantageously keeping the same distance from the chain centre to the plates so that constructionally-identical frame parts can also be used. This requirement is particularly met by the design in accordance with the invention in that in accordance with a further feature of the invention in particular the flanges are formed to extend as far as the region of sufficient overlap with the chain side bars of the smallest occurring side bar width, or in that at the ladder-chains having side bars which are less than the maximum occurring width, the side bars provided for connection to the flanges are provided with a projection by which the side bars are enlarged in the connection region to a projection corresponding to the maximum width of the side bars.

The arrangement of the chains close under the plates and their connection to the plates via the flanges—the plates remaining free of connecting means through these flanges—is also advantageous for the overlapping region of the plates—namely in that the sealing between the plates can be effected over a small radius, on the other hand however can also be effected with a high arch in the overlapping region which is advantageous as a retaining strip during steep-gradient conveying. In particular, the overlap is such that the leg—directed upwards from the plate plane—together with the roof-shaped arch of the adjacent overlapping plate forms—with appropriate shaping of the arch—the sealing gap present over the pivot region, while—in order to open the pocket formed between the roof-shaped arch and the upwards-directed leg—the downwards-directed leg of the roof-shaped arch withdraws from the adjacent plate when the plates pivot in relation to one another at the reversal of direction, so that material to be conveyed which unavoidably accumulates in the pocket can issue upon the reduction in size of the pocket.

Embodiments of the invention are shown in the drawings and are described below with the aid of the drawings.

Figure 2:
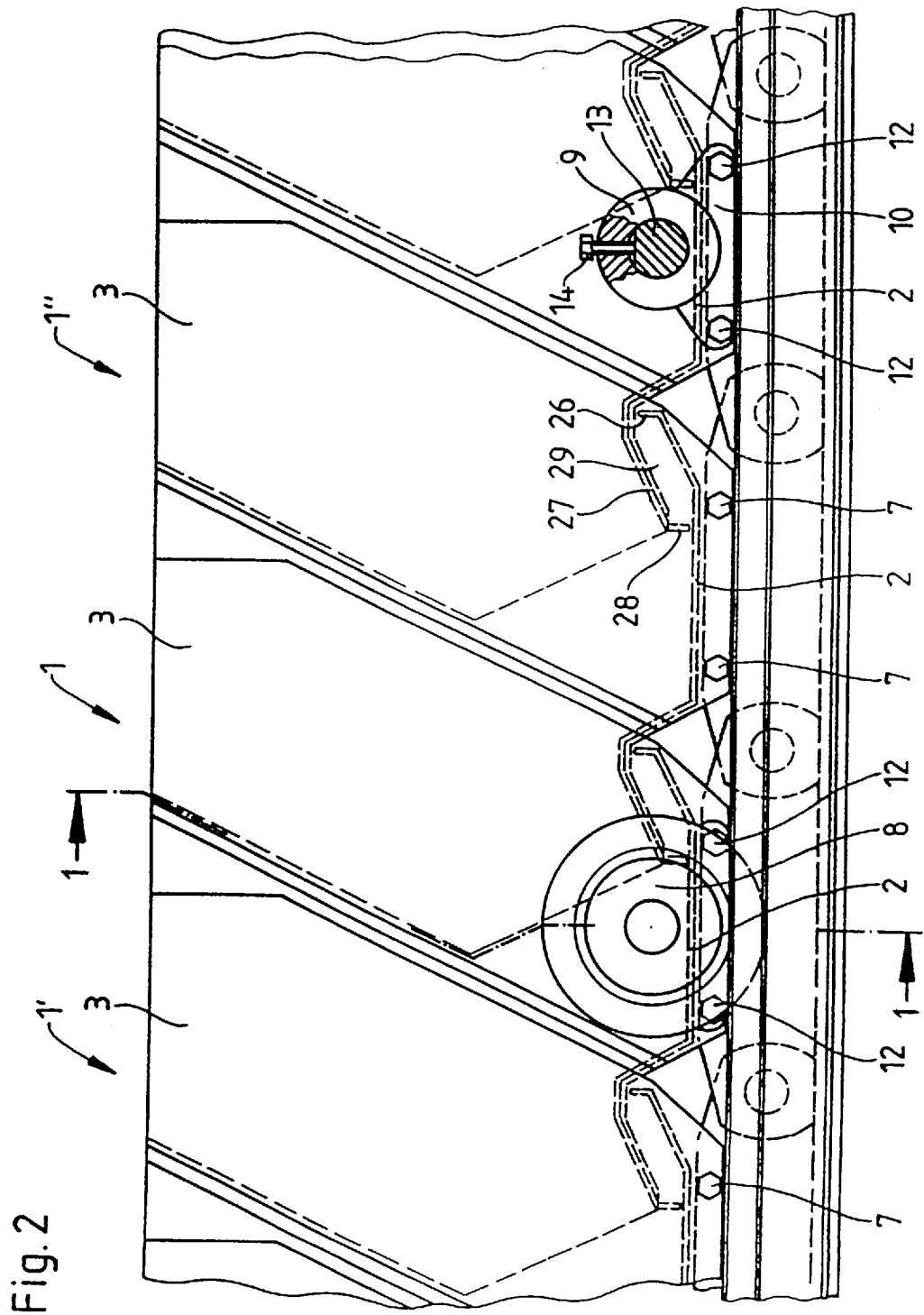
Figure 2A:
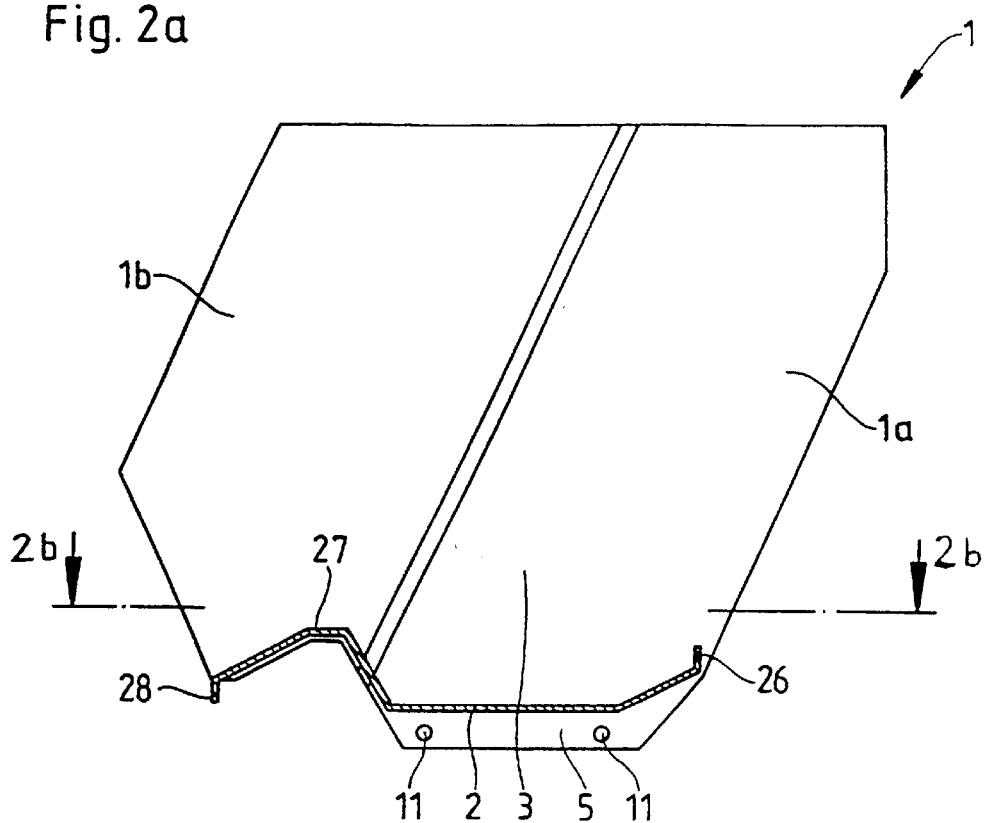
Figure 2B:
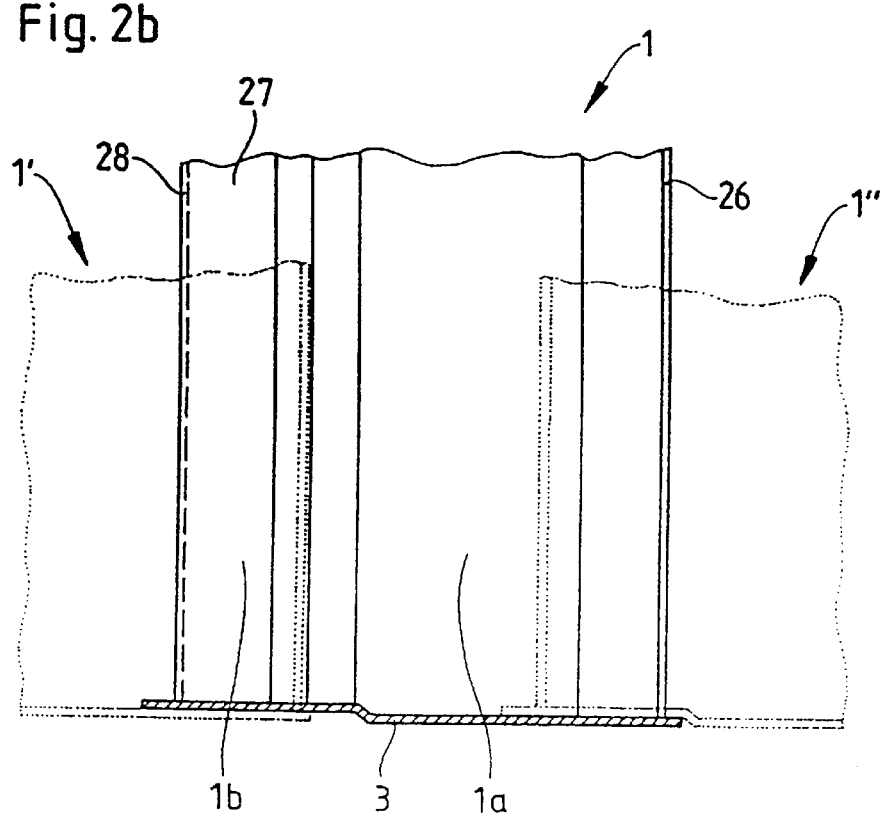

FIG. 1 shows an embodiment of an apron conveyor in accordance with the invention, in cross-section through the upper strand in accordance with the cutting line I—I of FIG. 2 and in FIG. 2 in the form of a lateral view of a portion of the upper strand, an individual element thereof being shown in FIG. 2a in longitudinal section and in FIG. 2b in the form of a plan view of a detail, sectioned in accordance with the cutting line b—b of FIG. 2.

FIG. 3 shows a detail of FIG. 1, enlarged, and

FIG. 4 shows a modification of the detail in accordance with FIG. 3. The connection of elements of the apron conveyor to chain side bars of differing size is shown in FIGS. 5a and 6a and in FIGS. 5b and 6b in cross-section and in FIGS. 5c and 6c in the form of lateral views of details.

Figure 7:
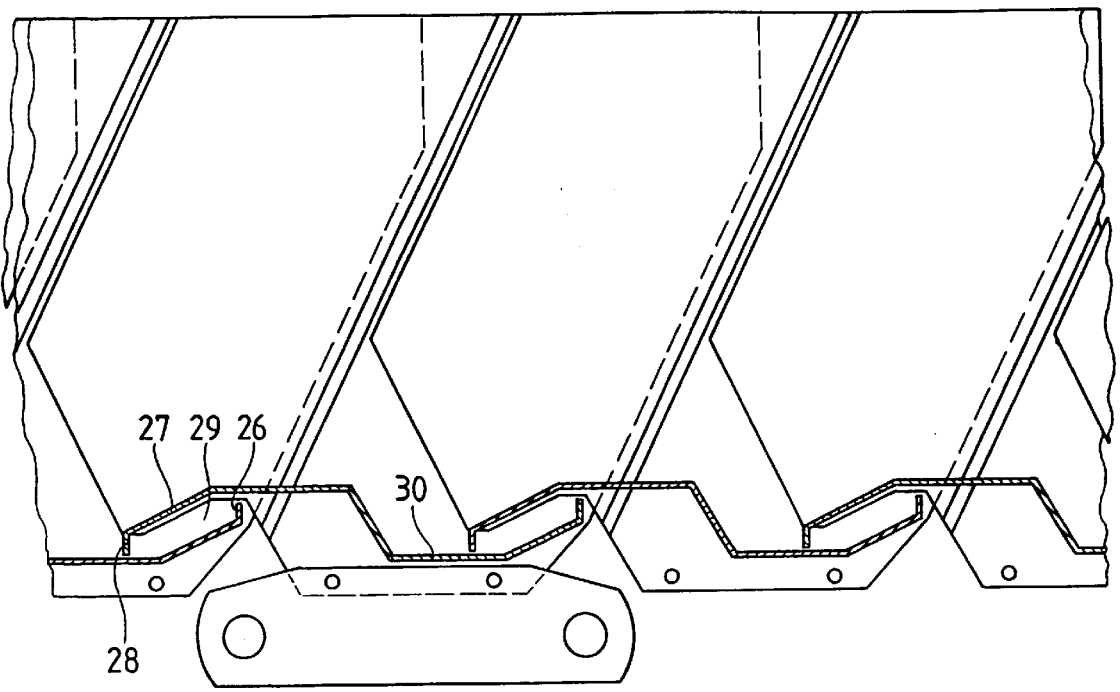

FIG. 7 shows an apron conveyor portion in longitudinal section, in

Figure 8:
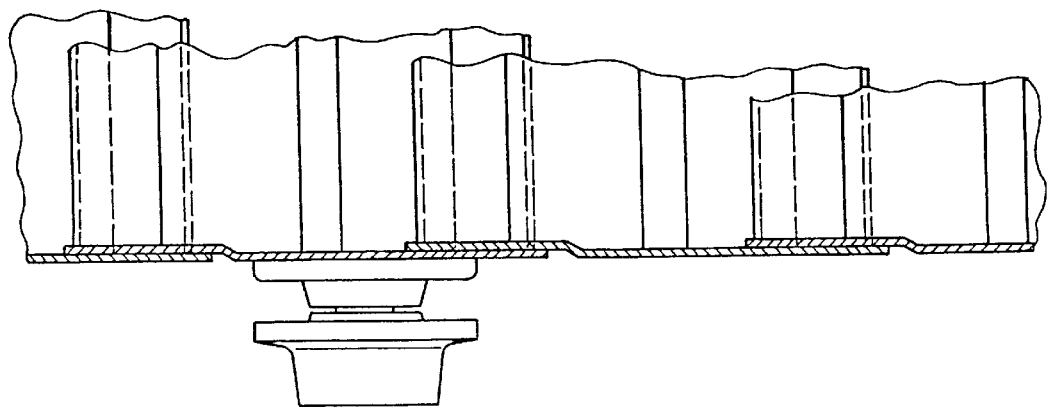

FIG. 8 in the form of a detail of a plan view, and in

Figure 9:
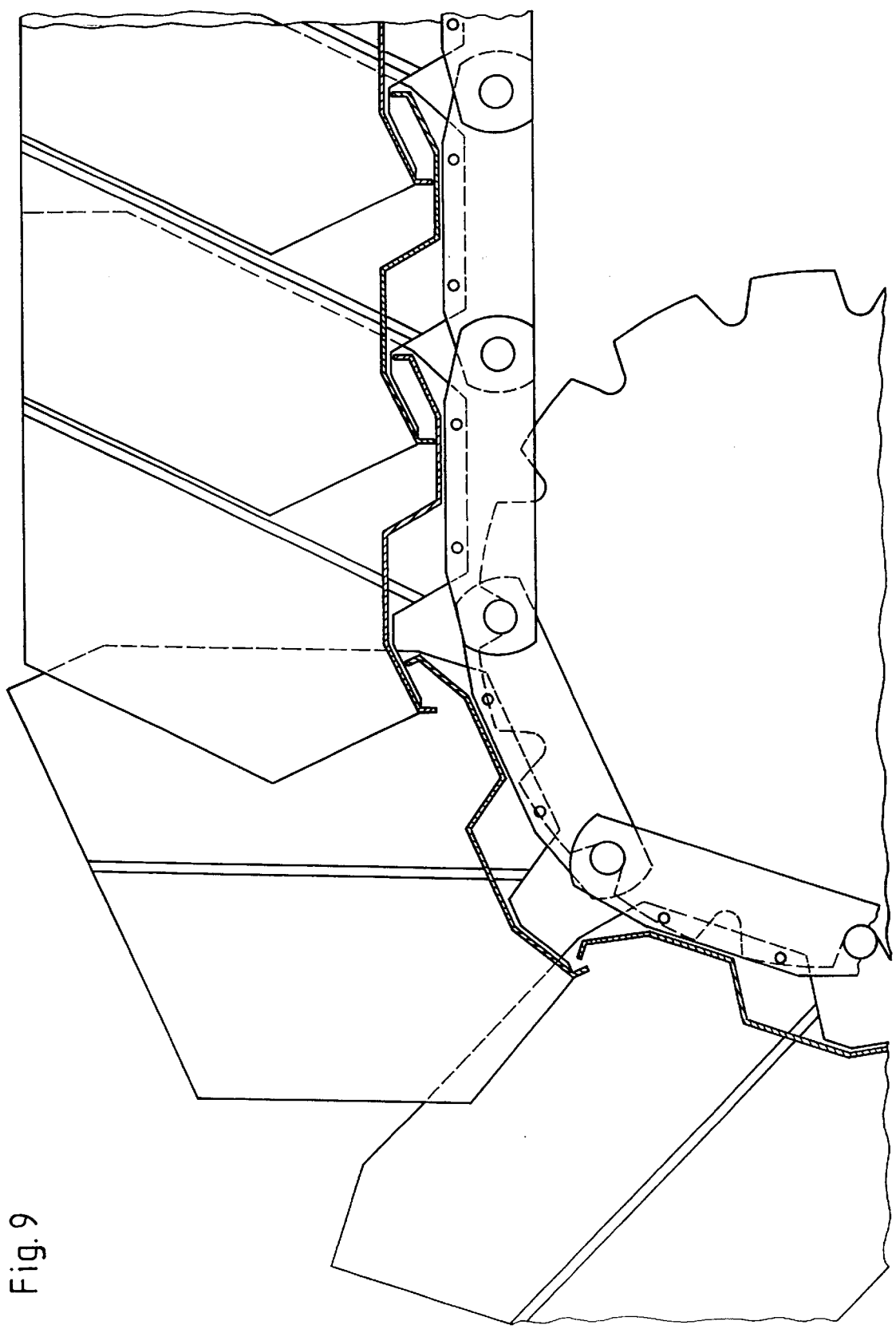

FIG. 9 at the reversal of direction, and in a modified embodiment in

Figure 10:
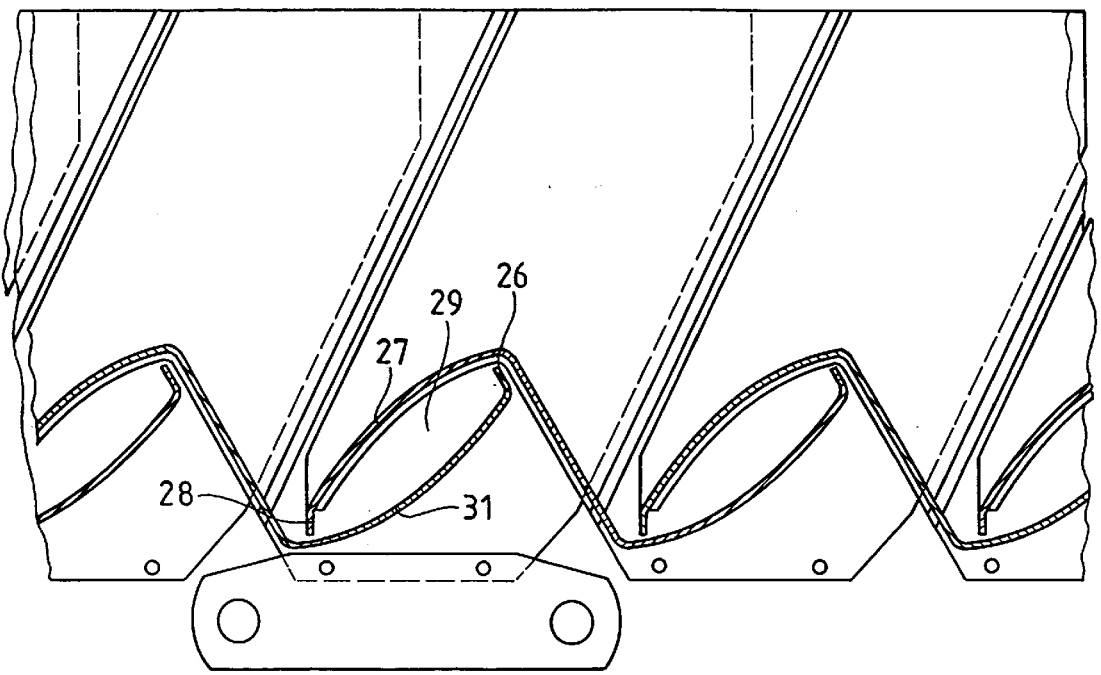

FIG. 10 in cross-section, in

Figure 11:
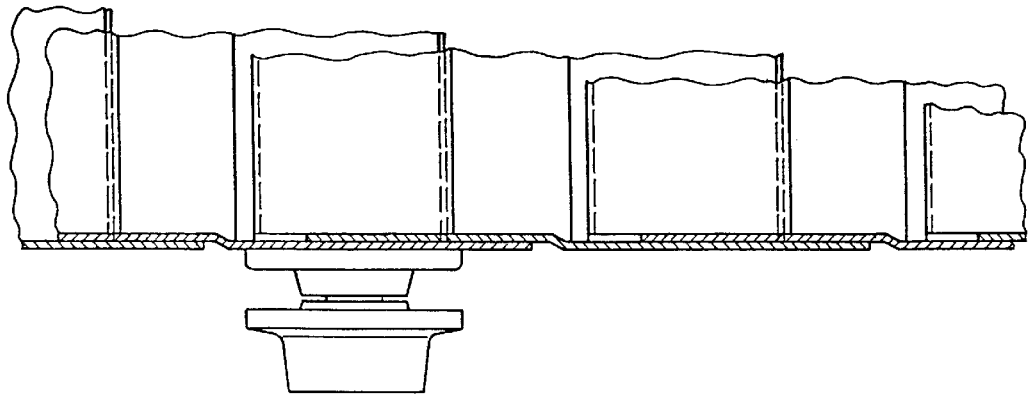

FIG. 11 in the form of a detail of a plan view, and in

Figure 12:
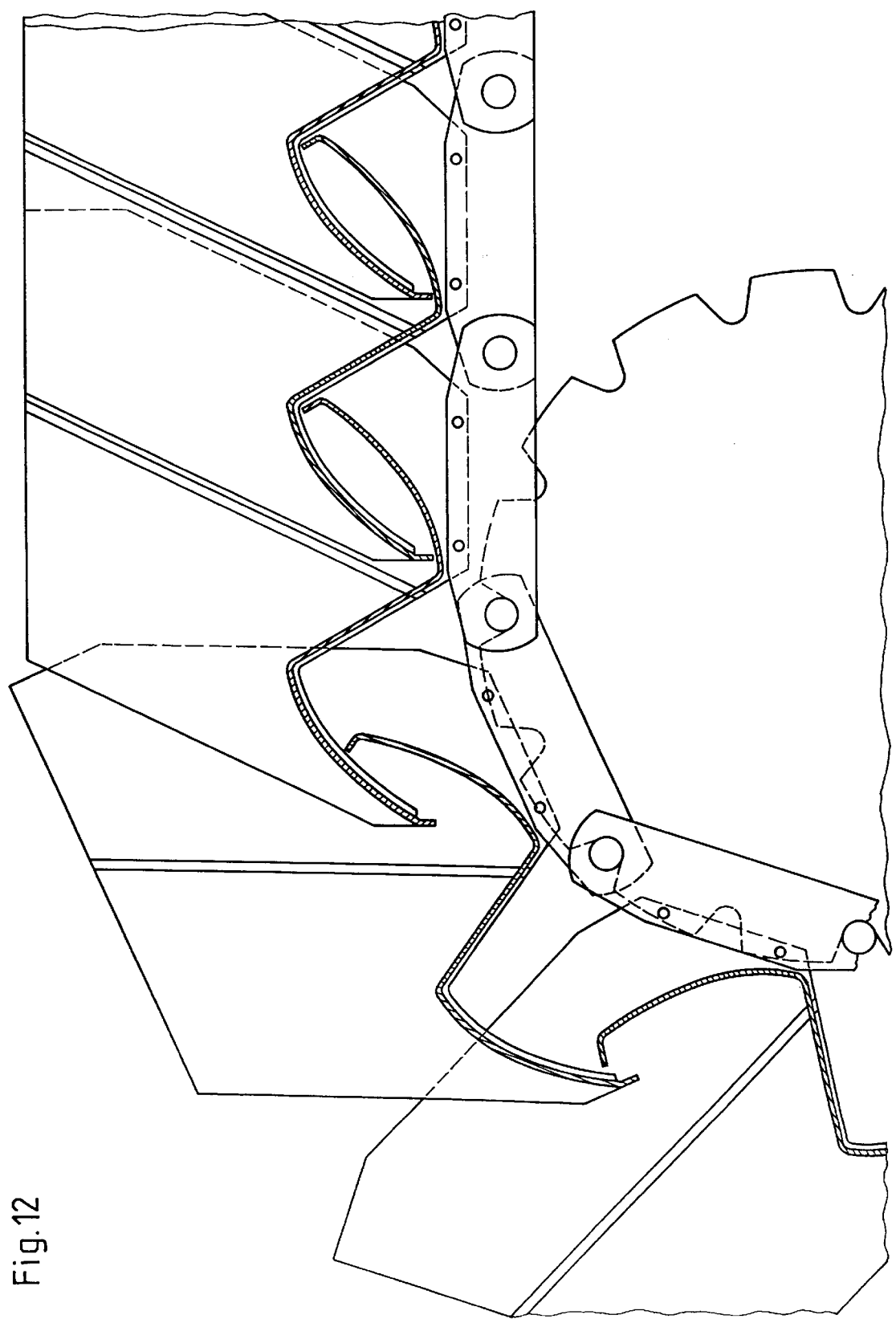

FIG. 12 at the reversal of direction.

With an embodiment shown in FIGS. 1, 2, 2a and 2b, the apron conveyor is formed from elements 1 one of which is shown in FIGS. 2a and 2b as a detail. Each element 1 is composed of a plate 2 and perpendicularly adjoining lateral walls 3. Each element 1 has a main region 1a and an overlapping region 1b. In the overlapping region 1b, the lateral walls 3 are offset towards the belt centre so that the overlapping regions 1b of the elements 1 can engage with the main region 1a of an adjacent element 1, as can be seen from FIG. 2b with the adjacent elements 1' and 1" shown by dotted lines.

The elements 1 of the apron conveyor are connected through ladder-chains 4, the elements 1 and the ladder-chains 4 having the same pitch. To connect the elements 1 to the ladder-chains 4, the lateral walls 3 are extended below the plate 2 and they form flanges 5 with these extensions, side bars 6a of outer side bar pairs contacting with these flanges 5 direct and being secured via screws 7 and side bars 6i of inner side bar pairs of the ladder-chains 4 contacting with these flanges 5 via applied distance plates and being secured via screws 7. The distance plates are not necessary when ladder-chains are used whose side bars are provided with central parts in alignment in the longitudinal direction having on the one hand inwards and on the other hand outwards offset or out-of-line end parts resulting in joinable forks.

Rollers 8 are provided to support the apron conveyor. These rollers 8 are connected to the elements 1 and ladder-chains 4 in an integral multiple—double in the embodiment in accordance with FIGS. 1 and 2—of the pitch of elements 1 and ladder-chains 4. For this purpose, axle bolt holders 9 are provided whose flange plates 10 are provided with holes congruent with the holes 11 in the flanges 5 and are together with the side bars 6a, 6i of the chain 4—which they face at the flanges 5—secured by screws 12. The axle bolts 13 of the rollers 8 are detachably secured in the axle bolt holders 9 in an appropriate manner, for example through split pins, cotter pins or—as shown in the right-hand part of FIG. 2 with the roller 8 removed—through a locking screw 14. The apron conveyor is supported on rails 15 via the rollers 8, these rails 15 being parts of a frame (not shown).

As shown by the detail of FIG. 1 shown in FIG. 3, the flange 5 is formed by the lateral wall 3 itself through its extension below the plate 2. If the lateral walls 16 are manufactured through bending of the plate 17, flanges 18 are connected—for example through welding—to the lateral walls 16 so as to form an extension of the latter, as shown in FIG. 4.

The connection of the chain side bars to the flanges in the extension of the lateral walls makes simple the combining in load ranges of chains of different dimension, therefore loading capacity, with the elements depending on the working loads to be expected, and consequently the constructing of apron conveyors for different circumstances using the modular system. To make this possible, with the embodiment in accordance with FIGS. 5a, 5b and 5c the flange 19 is dimensioned for connection to a wide chain side bar 20. The narrower chain side bar 21 has to be provided with a projection 22 in addition to its standard width. In accordance with the embodiment shown in FIGS. 6a, 6b and 6c, chain side bars of differing width can like the wider chain side bar 23 and the narrower chain side bar 24 be connected to a flange 25 when the latter is dimensioned in such a manner that it has sufficient overlap Z even with the narrower chain side bar 24.

As shown in FIGS. 2, 7 and 10, the plates (plate 2 in FIG. 2) are such that they overlap one another in that one of the transverse edges of the plates has an upwards-directed leg 26 and the other transverse edge is provided with a roof-shaped arch 27 which spans the leg 26 of the adjacent plate 2 and has a downwards-directed leg 28. The upwards-directed leg 26 forms a pocket 29 together with the roof-shaped arch 27 and the downwards-directed leg 28. The upwards-directed leg 26 collects the material to be conveyed possibly infiltrating into the pocket 29 under the leg 28, and thus prevents the subsequent infiltration of additional material to be conveyed in the manner of a labyrinth seal which opens at the reversal of direction (see FIGS. 9 and 12) so that compression of the material to be conveyed which has collected in the pocket 29 is ruled out. The particular advantage of design freedom for the plates can be seen from FIGS. 2, 7 and 10. Thus the design of the plates 2 which can be seen from FIG. 2 has the advantage that the end regions are uniform in cross-section and therefore can be shaped by means of a single tool. The advantage is even clearer with the design of the plates 30 in FIG. 7 and of the plates 31 in FIG. 10, since the cross-sections of the plates 30 and of the plates 31 are composed of identical halves and shaping of these cross-sections only requires a single tool.

I claim:

1. An apron conveyor whose elements—which consist of plates with perpendicularly adjoining lateral walls and which overlap one another—are arranged on ladder-chains and have a pitch which corresponds to the chain pitch, in the overlapping region of the plates the transverse edges of the latter being provided on the one hand with a leg directed upwards from the plate plane and on the other hand with a roof-shaped arch which spans the upwards-directed leg of the adjacent plate and from which there issues a leg which is directed downwards towards the plate plane and together with the roof-shaped arch and the upwards-directed leg of the adjacent plate forms a pocket which opens at the reversal of direction, the lower end of the downwards-directed leg lying in a sealing manner opposite the plate located thereunder—optionally while keeping at a slight distance therefrom—when the apron conveyor is in the extended state, characterised in that in extension of the lateral walls (3) there are provided flanges (5) which are connected to the lateral walls (3) or are formed by the lateral walls (3), the chain side bars (6a, 6i) being connected to the flanges (5) with lateral contact.

2. An apron conveyor in accordance with claim 1, characterised in that together with the chain side bars (6a, 6i), axle pin holders (9)—lying opposite the chain side bars (6a, 6i) at the flanges (5)—are connected to the flanges (5).

3. An apron conveyor in accordance with claim 1, whose elements are within a load range connectable to ladder-chains of different cross sectional dimension while the distance from the chain centre to the plates remains the same, characterised in that the flanges (25) are formed to extend as far as the region of sufficient overlap (Z) with the chain side bars (24) of the smallest occurring width.

4. An apron conveyor in accordance with claim 2, whose elements are within a load range connectable to ladder-chains of different cross sectional dimension while the distance from the chain centre to the plates remains the same, characterised in that the flanges (25) are formed to extend as far as the region of sufficient overlap (Z) with the chain side bars (24) of the smallest occurring width.

5. An apron conveyor in accordance with claim 1, whose elements are within a load range connectable to ladder-chains of different cross sectional dimension while the distance from the chain centre to the plates remains the same, characterised in that at the ladder-chains having side bars which are less than the maximum occurring width, the side bars (21) provided for connection to the flanges (25) are provided with a projection (22) by which the side bars (21) are enlarged in the connection region to a projection (22) corresponding to the maximum width of the side bars.

6. An apron conveyor in accordance with claim 2, whose elements are within a load range connectable to ladder-chains of different cross sectional dimension while the distance from the chain centre to the plates remains the same, characterised in that at the ladder-chains having side bars which are less than the maximum occurring width, the side bars (21) provided for connection to the flanges (25) are provided with a projection (22) by which the side bars (21) are enlarged in the connection region to a projection (22) corresponding to the maximum width of the side bars.

7. An apron conveyor in accordance with claim 1, characterised in that the leg (26)—directed upwards from the plate plane—together with the roof-shaped arch (27) of the adjacent overlapping plate form—with appropriate shaping of the arch (27)—the sealing gap present over the pivot region, while—in order to open the pocket (29) formed between the roof-shaped arch (27) and the upwards-directed leg (26)—the downwards-directed leg (28) of the roof-shaped arch (27) withdraws from the adjacent plate when the plates (2, 30, 31) pivot in relation to one another at the reversal of direction.

8. An apron conveyor in accordance with claim 2, characterised in that the leg (26)—directed upwards from the plate plane—together with the roof-shaped arch (27) of the adjacent overlapping plate form—with appropriate shaping of the arch (27)—the sealing gap present over the pivot region, while—in order to open the pocket (29) formed between the roof-shaped arch (27) and the upwards-directed leg (26)—the downwards-directed leg (28) of the roof-shaped arch (27) withdraws from the adjacent plate when the plates (2, 30, 31) pivot in relation to one another at the reversal of direction.

9. An apron conveyor in accordance with claim 3, characterised in that the leg (26)—directed upwards from the plate plane—together with the roof-shaped arch (27) of the adjacent overlapping plate form—with appropriate shaping of the arch (27)—the sealing gap present over the pivot region, while—in order to open the pocket (29) formed between the roof-shaped arch (27) and the upwards-directed leg (26)—the downwards-directed leg (28) of the roof-shaped arch (27) withdraws from the adjacent plate when the plates (2, 30, 31) pivot in relation to one another at the reversal of direction.

10. An apron conveyor in accordance with claim 4, characterised in that the leg (26)—directed upwards from the plate plane—together with the roof-shaped arch (27) of the adjacent overlapping plate form—with appropriate shaping of the arch (27)—the sealing gap present over the pivot region, while—in order to open the pocket (29) formed between the roof-shaped arch (27) and the upwards-directed leg (26)—the downwards-directed leg (28) of the roof-shaped arch (27) withdraws from the adjacent plate when the plates (2, 30, 31) pivot in relation to one another at the reversal of direction.

11. An apron conveyor in accordance with claim 5, characterised in that the leg (26)—directed upwards from the plate plane—together with the roof-shaped arch (27) of the adjacent overlapping plate form—with appropriate shaping of the arch (27)—the sealing gap present over the pivot region, while—in order to open the pocket (29) formed between the roof-shaped arch (27) and the upwards-directed leg (26)—the downwards-directed leg (28) of the roof-shaped arch (27) withdraws from the adjacent plate when the plates (2, 30, 31) pivot in relation to one another at the reversal of direction.

12. An apron conveyor in accordance with claim 6, characterised in that the leg (26)—directed upwards from the plate plane—together with the roof-shaped arch (27) of the adjacent overlapping plate form—with appropriate shaping of the arch (27)—the sealing gap present over the pivot region, while—in order to open the pocket (29) formed between the roof-shaped arch (27) and the upwards-directed leg (26)—the downwards-directed leg (28) of the roof-shaped arch (27) withdraws from the adjacent plate when the plates (2, 30, 31) pivot in relation to one another at the reversal of direction.

13. An apron conveyor in accordance with claim 7, characterised in that in their end regions adjacent to the transverse edges, the plates (2, 30, 31) are uniformly constructed with the upwards-directed leg (26) on the one hand and the roofshaped arch (27) on the other hand.

14. An apron conveyor in accordance with claim 13, characterised in that the plates (30, 31) are uniformly constructed from the centre to the transverse edges.

15. An apron conveyor in accordance with claim 7, characterised in that the roof-shaped arch (27) is rounded or polygonal, adapted in the pivot region to the arc described by the upper edge of the upwards-directed leg (26).

16. An apron conveyor in accordance with claim 13, characterised in that the roof-shaped arch (27) is rounded or polygonal, adapted in the pivot region to the arc described by the upper edge of the upwards-directed leg (26).

17. An apron conveyor in accordance with claim 14, characterised in that the roof-shaped arch (27) is rounded or polygonal, adapted in the pivot region to the arc described by the upper edge of the upwards-directed leg (26).

18. An apron conveyor in accordance with claim 2, characterised in that the axle pin holder (9) is formed from a flange (10), resting on the flange (5) and connectable thereto, to form an eye having a bore for receiving the axle pin (13).

19. An apron conveyor in accordance with claim 2, characterised in that the axle pin (13) forming a mounting unit together with a roller (8), can be locked in the bore of the axle pin holder (9) by means of a locking pin (split pin, clamping screw 14).

20. An apron conveyor in accordance with claim 19, characterised in that the axle pin (13) forming a mounting unit together with a roller (8), can be locked in the bore of the axle pin holder (9) by means of a locking pin (split pin, clamping screw 14).

* * * * *